Patented May 25, 1926.

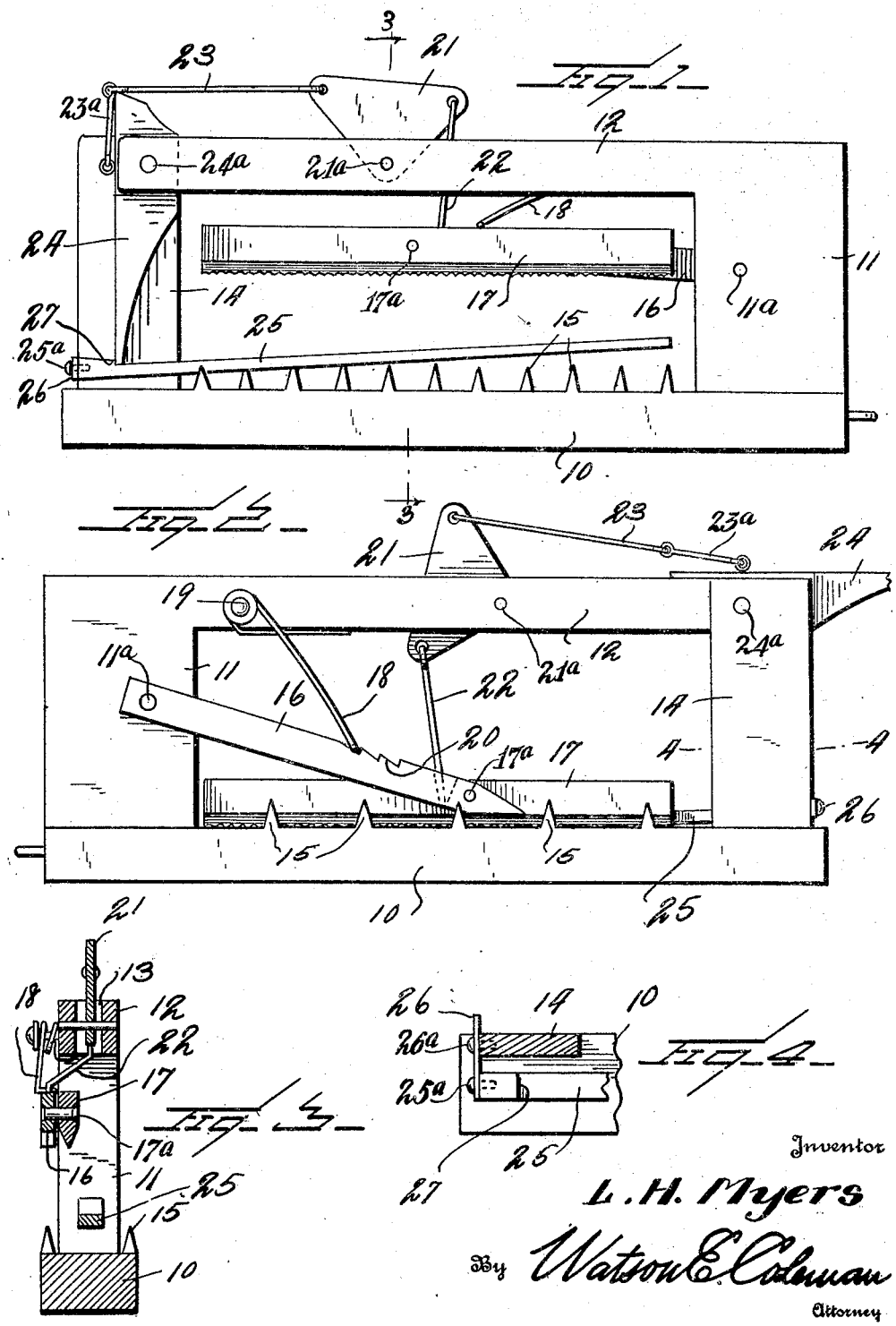

1,586,107

UNITED STATES PATENT OFFICE.

LEONIDAS H. MYERS, OF SEYMOUR, INDIANA.

DEADFALL TRAP.

Application filed June 27, 1925. Serial No. 40,004.

This invention relates to traps, and particularly to what are known as "dead-fall" traps.

The object of the invention is to provide a very simple, easily set and easily sprung trap of this character which has proved extremely effective in service and which is not required to be baited.

A further object is to provide a device of this character wherein the dead-fall itself, that is the bar which in falling strikes the animal, is pivoted at its middle so that if one end is held from depression under the action of the spring actuating the dead-fall, the other end will move downward to its full extent.

Other objects will appear in the course of the following description.

My invention is illustrated in the accompanying drawing, wherein:—

Figure 1 is a front elevation of a trap constructed in accordance with my invention;

Figure 2 is a rear elevation but showing the trap sprung;

Figure 3 is a section on the line 3—3 of Figure 1;

Figure 4 is a fragmentary section on the line 4—4 of Figure 2.

Referring to this drawing, it will be seen that the trap comprises the base 10 having mounted thereon a somewhat rectangular frame comprising the end member 11 and the longitudinal member 12 which is disposed above the member 11 and which is longitudinally slotted, as at 13. Extending upward from the base, which is wider than the members 11 and 12, and at the end of the base remote from the member 11 is an upright 14. The base of the trap is formed to provide laterally spaced, upwardly extending teeth 15, and preferably the frame of the trap with its teeth are all cast in one piece, though obviously the parts might be made in sections and bolted together.

Pivoted to the upright 11 by a pivot 11ª is a dead-fall supporting bar 16 which at its free end is pivotally connected to the deadfall 17 by a pivot 17ª whose lower face is preferably toothed or serrated. A spring 18 is coiled at its middle around a bolt or projection 19 and one arm of this spring bears upon a notch 20 on lever 16, while the other arm of the spring bears upward against the under face of the longitudinal bar 12. Thus the dead-fall is urged downward by the strength of this spring.

Disposed within the slot 13 is a triangular lever 21 pivoted upon a pin 21ª to the main frame which lever is connected by a link 22 to the forward end of the lever 16, the opposite corner of this member 21 being connected by a link 23 and a relatively short link 23ª to a latch 24. This latch is disposed within the slot and pivoted to the walls thereof by a pivot pin 24ª. This latch has a pointed lower extremity, and this latch may be turned down into a vertical position and when down in this vertical position acts to shift the triangular lever 21 which constitutes a bell crank lever and raises the dead-fall. When the latch is turned into its vertical position, as shown in Figure 1, it is locked in this position by means of the trigger 25. This trigger is pivoted by a screw 25ª to one end of a member 26 which is pivoted to the upright 14 at the outer edge thereof by a screw or like member 26ª (see Figure 4) and this trigger is formed with a shoulder 27 with which the extremity of the latch 24 engages. It is obvious that the trigger 25 may be rocked upon an axial center around the screw 25ª and that the member 26 is pivotally mounted upon the member 14 by means of the screw or pin 26ª so that this member 26 may oscillate in a vertical plane. In setting the trap, the latch 24 is pulled down to its vertical position and engaged with the shoulder 27 which raises the outer end of the trigger 25. At this time the lever 16 is raised, as is also the dead-fall 17, and the parts are locked in this position against the action of the spring 18. If now an animal strikes the trigger 25 at any point, it will dislodge the latch 24 from its engagement with the shoulder 27 and the spring 18 will immediately force down the dead-fall, catching the animal between the prongs 15 and the serrated face of the dead-fall and holding the animal securely in this position against release. The force with which the dead-fall springs downward is also very liable to kill the animal.

Small sizes of trap are particularly adapted for mice, rats and the like, but it will be understood that the trap may be made of any desired size and its size will depend upon the animals to be caught therein. The device has been found to be very effective in practice and no bait on the trap itself is required. Therefore, there is no necessity of re-baiting the trap. It is to be placed in the runway of the animal. Inasmuch as the trigger 25 is axially pivoted upon a pivoted member 26, the latch and the trigger may be readily adjusted so as to bring the trigger into proper engagement with the extremity of the latch 24.

The operation of the device will be obvious from what has gone before. The latch is retracted and the trigger raised until the shoulder 27 engages with the point of the trigger. This, as before stated, lifts the dead-fall and then if the animal strikes the trigger in any way the latch is released and the dead-fall falls, killing or holding the animal.

In the larger traps means are provided for preventing any upward movement of the dead-fall after the trap has been sprung, and to this end the spring 18 is so formed as to bear against the edge of the dead-fall supporting bar 16. This bar is formed of a plurality of ratchet notches with which the spring is adapted to engage when the trap has been sprung, the spring then acting to resist any upward movement of the dead fall.

Particular attention is directed to the manner of mounting the trigger 25. Mounting the trigger 25 upon the transverse member 26 and pivoting this upon the support 14 causes the trigger to be very sensitive to movement and this causes the trap to be sprung very readily. Furthermore, it permits the trigger 25, if broken, to be readily removed and a new trigger put in place.

While I have illustrated a certain form of my device, I do not wish to be limited thereto as it is obvious that many changes might be made in the details of construction and arrangement of parts without departing from the spirit of the invention. Preferably the members 10 with the members 11, 12 and 14 will be cast all in one piece, though any other manner of forming the frame of the trap and the separate parts thereof may be adopted if desired.

I claim:—

1. A dead-fall trap comprising a frame having a base, a lever pivoted upon the frame, a dead-fall pivotally connected to the lever, a spring urging the dead-fall downward toward the base, a latch operatively connected to the dead-fall, and a trigger engageable with the latch to hold the dead-fall raised and when released from the latch permitting the dead-fall to drop under the action of the spring.

2. A trap of the character described comprising a rectangular frame including a base having upwardly extending teeth, a lever pivoted to one end of the frame above the base, a dead-fall pivotally mounted upon the lever and confronting the base, a spring urging the lever downward, a bell crank lever pivoted upon the frame above the dead-fall and operatively connected to the dead-fall carrying lever, a latch pivoted to the frame and operatively connected to said bell crank lever, and a trigger pivotally connected to one end of the frame and having a shoulder with which the latch is adapted to engage when the dead-fall is raised.

3. A trap of the character described comprising a rectangular frame including a base having upwardly extending teeth and including a longitudinally extending slotted member above the base, a lever pivoted to one end of the frame and extending over the base, a dead-fall pivoted to the extremity of the lever and confronting the base, a spring urging the lever downward, a bell crank lever pivoted within the slot of the upper member and having a link connection to the lever, a latch pivoted within the slot, a flexible connection leading from said latch to the bell crank lever, and a trigger pivotally mounted upon one end of the frame and having a shoulder adapted to engage the latch when the latter is turned into a vertical position and the dead-fall raised.

4. A dead-fall trap comprising a frame having a base, a spring attached to said frame, a dead-fall operatively engaged by the spring and urged downward thereby, a latch operatively connected to the dead fall, a trigger engageable with the latch to hold the dead-fall raised and when released from the latch permitting the dead-fall to drop under the action of the spring, and means for preventing the upward movement of the dead-fall after the trap has been sprung.

5. A trap of the character described comprising a rectangular frame including a base, a lever pivoted to one end of the frame above the base, a dead-fall pivotally mounted upon the lever and confronting the base, a spring urging the lever downward and riding along the edge face of the lever, the edge face of the lever being formed with a plurality of ratchet notches with which the spring is adapted to engage, a latch operatively connected to the dead-fall to hold the dead-fall raised when the latch is in a predetermined position, and a trigger supported at one end of the frame and having a shoulder with which the latch is adapted to engage when the dead-fall is raised.

6. A dead-fall trap comprising a frame having a base and an upwardly extending member at one end thereof, a dead-fall, a spring connected to the top of the frame and urging the dead-fall downward, a pivoted latch mounted upon one end of the frame operatively connected to the dead-fall to lift it when the latch is turned into a predetermined position, a trigger engageable with the latch to hold the dead-fall raised and when released from the latch permitting the dead-fall to drop, and means for supporting the trigger comprising a member pivoted to the upwardly extending member, the extremity of the trigger being detachably connected to the upper end of said pivoted member.

In testimony whereof I hereunto affix my signature.

LEONIDAS H. MYERS.